United States Patent

[11] 3,627,943

| [72] | Inventor | Armin Blumer<br>Schwanden, Switzerland |
|---|---|---|
| [21] | Appl. No. | 824,968 |
| [22] | Filed | May 15, 1969 |
| [45] | Patented | Dec. 14, 1971 |
| [73] | Assignee | Maschinenfabrik und Giesserei Netstal AG<br>Netstal, Switzerland |

[54] TOOLHOLDING ARRANGEMENT INCLUDING IMPROVED CONTROL SIGNAL PRODUCING MEANS
11 Claims, 6 Drawing Figs.

[52] U.S. Cl.................................................. 200/52,
200/61.42, 200/82 R, 323/75 N
[51] Int. Cl...................................................... H01h 35/00
[50] Field of Search........................................... 200/52,
61.2, 61.22, 61.4, 61.41, 61.42, 61.43, 61.44, 82
R; 335/61, 41–43; 323/75 N

[56] References Cited
UNITED STATES PATENTS

| 3,100,546 | 8/1963 | Cramwinckel | 323/75 N UX |
|---|---|---|---|
| 3,379,841 | 4/1968 | Lombard | 200/82 |
| 3,487,182 | 12/1969 | Grundy | 200/61.42 |

Primary Examiner—J. R. Scott
Attorney—McGlew and Toren

ABSTRACT: A toolholding arrangement employing tie rods, more particularly for machines for the injection moulding of plastics materials, of the kind having a first tool carrier movable by means of a holding mechanism on the tie rods supported on one end of the tie rod, and a second tool carrier supported on the other end of the tie rod. In accordance with the invention, means are arranged on each individual tie rod, which transform a tie rod load exceeding a predetermined size, into an operating parameter to which there responds a sensitivity device providing a control signal.

Fig. 1

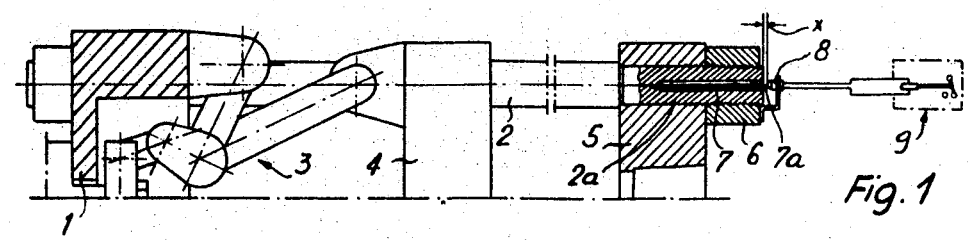
Fig. 1
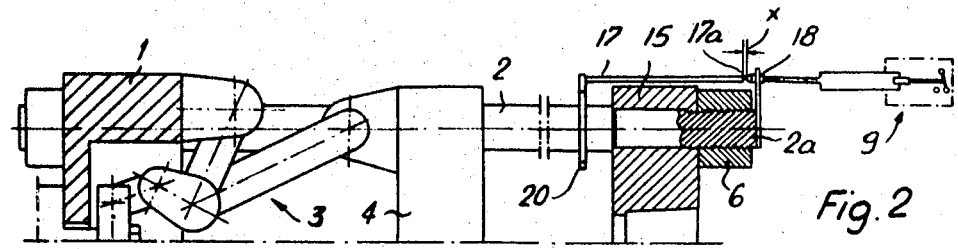
Fig. 2
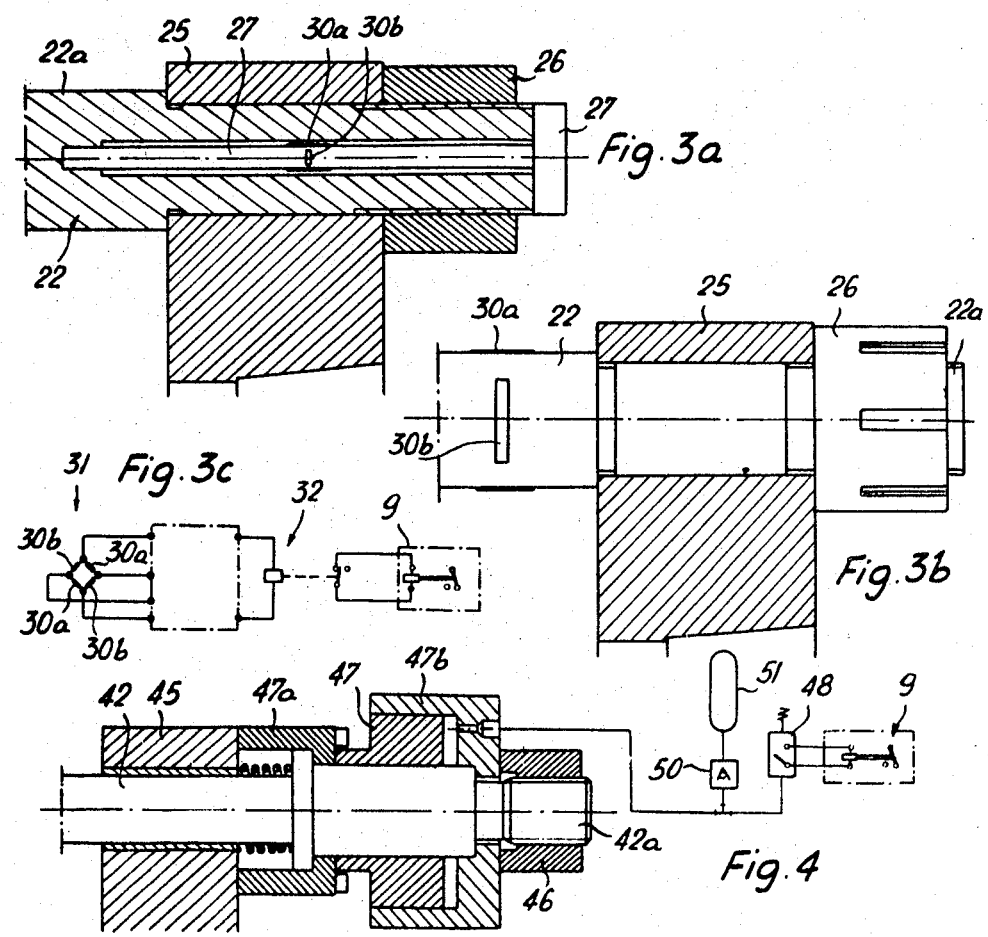
INVENTOR.
ARMIN BLUMER
BY McGlew and Toren
ATTORNEYS

# 3,627,943

TOOLHOLDING ARRANGEMENT INCLUDING IMPROVED CONTROL SIGNAL PRODUCING MEANS

SUMMARY OF THE INVENTION

On machines for the injection molding of plastics materials (but also on other similarly operating machines with tool carriers pressing on one another) considerable closing power occurs when closing the mold (whose two halves are mounted on the tool carriers), which power must be absorbed by the tie rods. The tie rods are quite considerably oversized so as to withstand possible overstressing. Such overloads, which can occur for example by constructional inexactitudes, temperature strain effects, wearing of the bearing or the like, do not usually distribute themselves equally over all the tie rods (usually two, three or four such tie rods exist) but take effect completely on the one or another tie rods and can lead, in spite of liberal dimensions, to fracture.

It is an object of the invention to avoid or minimize these disadvantages, and accordingly the invention consists in a toolholding arrangement employing tie rods, particularly for a machine for the injection molding of plastics materials, of the kind having a first tool carrier movable by means of a holding mechanism supported on one tie rod end and a second tool carrier supported on the other end of the tie rod, wherein means are arranged on each individual tie rod, which transform a tie rod loading exceeding a predetermined size, into an operating parameter to which there responds a sensitivity device providing a control signal.

The control signal produced as a result of overloading of the tie rod can be used for activating a warning device and/or for automatically starting the machine. Thereby the occurrence of overloading of any of the tie rods can be substantially avoided.

BRIEF DESCRIPTION OF THE DRAWING

In order that the invention may be more clearly understood, reference will now be made to the accompanying drawings which show certain embodiments thereof in schematic form by way of example, and in which:

FIG. 1 shows part of a first embodiment of a toolholding arrangement as fitted to an injection molding machine, partly in axial section, FIG. 2 shows a second embodiment also in section, FIG. 3a shows an axial section through a detail of a third embodiment, FIG. 3b shows a modification of the embodiment of FIG. 3a, FIG. 3c shows a wiring diagram of a sensitivity device mounted on the embodiments in accordance with FIGS. 3a and 3b; and FIG. 4 shows an axial section through a detail of a fourth embodiment.

DESCRIPTION OF THE PREFERRED EMBODIMENTS

Referring now to the drawings, the toolholding arrangement shown in part in FIG. 1 has a support plate 1 on which are supported, in any desired fashion, at least two horizontal tie rods 2 (only one being shown) by one of their ends. Furthermore, a cranked lever 3 is mounted on the support plate 1, which lever is connected on the one hand for example to an hydraulic drive mechanism (not shown), and on the other hand to a driveable mold carrying plate 4. The mold-carrying plate 4 is guided on the tie rods 1. The other ends of the tie rods pass at 2a through a second mold carrying plate 5, which is supported by means of a stop nut 6, on the tie rod 2, that engages an external thread at this end of the tie rod. The tie rod end 2a is provided with an axial bore, through which extends a bar 7, one end of which is fixed to the tie rod 2, while the free front end 7a thereof terminate approximately at the free front end of the tie rod. The casing of a precision switch 8 is fixed to the stop nut 6, and has an actuating member connected to the free end of the bar 7. The switching distance x between the switch 8 and the free front end of the bar 7 is adjustable. The switch 8 is connected electrically to a relay 9, which for example is wired into a control circuit of an electronic machine control and/or a warning device. On closing the mold, the halves of the mold carried by the mold-carrying plate 4 are pressed against the halves of the mold carried by the plate 5; the mold closing pressure is transmitted by the plate 5 via the stop nut 6 to the individual tie rods. The switch 8 is adjusted in such a manner that, for normal loading of the tie rod 2, the tie rod expansion between the anchorage point of the bar 7 and the stop nut 6 does not exceed the adjusted switch distance $x$. Should the loading and thus the elongation of any of the tie rods 2 exceed a predetermined allowable value, then the distance between the free front end 2a of the bar 2 and the switch is also increased, and the switching distance exceeds the value $x$; the local expansion of the tie rod which occurs as a result of the overloading is thereby converted into an operation parameter in the form of an increase in the switching distance, to which the switch 8 responds; the electric signal thus produced, effects, via the relay 9, the starting of the machine (or the starting of an optical and/or acoustic warning device), so that any dangerous overloading of the tie rods can be avoided.

In the embodiment according to FIG. 2, a bar 17 external to the tie rod is provided for transforming the overloading of the tie rod 2 (of the toolholding arrangement constructed similarly to FIG. 1) which, at one end, is secured to a carrier 20 seated on the tie rod 2 and at the other end works in conjunction with a limit switch 18. The switching distance $x$ of the switch 18 is also adjustable from the free front end 17a of the bar 17. The switch 18 is secured to the free front end 2a of the tie rod 2 but, however, could be fixed to the stop nut 6 similarly to the arrangement of FIG. 1. A signal produced in the circuit of the switch 18 can be used, via the relay 9, for activating a warning device and/or starting the machine. In this embodiment also, the closing power is transmitted via the mold carrying plate 5 and the stop nut 6 to the tie rod 2 and the arrangement is such that if the tie rod loading and therefore the tie rod elongation between the anchorage point of the bar 17 and the nut 6 exceeds a predetermined value, the switching distance $x$ is exceeded correspondingly and thereby the switch 18 is activated to produce a signal.

In the embodiment in accordance with FIG. 3, the end 22a of the rod 22 carrying a mold carrying plate 25 and the stop nut 26 of each tie rod is provided with an axial bore, through which extends a bar 27. One end of the bar 27 is screwed into place on the tie rod 22 and the other end thereof is secured via a head member 27a to the free front end 22a of the tie rod end 22. The bar 27 can be installed in such a way that it is slack with an unloaded tie rod 22; however, the bar 27 may be prestressed, if desired. On the periphery of the bar 27 are arranged two pairs of elongation measurement strips or strain gauges 30a and 30b, the pair 30a being arranged in the longitudinal direction of the bar 27 and the other pair 30b being arranged around the periphery of the bar 27; consequently, the pair of strips 30a reacts to the longitudinal elongation of the bar 27 and thereby also the tie rod, while the pair of strips 30b is intended for temperature expansion compensation. Both pairs of strips 30a and 30b are connected in a manner known per se to a Wheatstone bridge 31 (FIG. 3c) which is connected via an amplifying and switching device 32 to the relay 9. The arrangement is transmitted as an expansion to the bar 27, exceeds a predetermined value, the bridge 31 is balanced so as to produce a signal to activate the switching device 32 and thus, via the relay 9, e.g. a warning device or starting the machine for its control. This arrangement has the advantage that the measurement strips are not subject to any external influences. However, if desired, it is possible, as FIG. 3b shows, to arrange the measurement strips or strain gauges directly on the tie rod, whereby the cost of construction is considerably less.

In the previously described embodiments, an elongation induced through the overloading of the tie rod is used for producing an operational parameter to produce a signal, thus, in both the first embodiments a switching distance is induced by this tie rod elongation, but in the third embodiment, on the other hand, an electrical quantity produced through the elongation, is used as the operational parameter. Another embodiment is shown in FIG. 4. Here, too, the mold carrying plate 45 rests on the tie rods 42. On the end 42a of the tie rod 42 projecting from the mold carrying plate 45 rests a pressure box 47a secured to the mold-carrying plate 42, which box acts on a piston 47 guided on the tie rod end 42a; the piston 47 reciprocates in a cylinder 47b, which is supported at one end against a stop nut 46 engaging on external thread of the tie rod end 42a. The interior of the cylinder 47b is connected via a back pressure valve 50 to a pressure medium source 51 and also to a pressure switch 48 which is linked to the relay 9. On closing the mold, the pressure acting on the mold-carrying plate 45 is conveyed, via the box 47a, the piston 47 and the pressure medium contained in the cylinder 47b, whose pressure is somewhat higher (e.g. by 5 percent) than the rated power of the machine, by the tie rod, to the cylinder 47b and thereby via the stop nut 46 to the tie rod 42. If the loading on one tie rod exceeds the predetermined pressure of the medium in the cylinder 47b, then the medium activates the pressure switch 48; the signal thus produced is also used via the relay 9 for activating a warning device and/or directly for starting the machine. The operating parameter in this case is an excess pressure of the pressure medium exceeding the rated pressure, which as in the aforementioned embodiments leads to a switching process releasing a warning device and/or starting the machine.

What is claimed is:

1. In a toolholding arrangement of the type employing a fixed support plate, at least one tie rod secured at one end to the support plate, a first tool carrier movable along the tie rod, a second tool carrier supported on the other end of the tie rod, and means operable to exert a force between the support plate and the first tool carrier to move the first tool carrier into cooperating relation with the second tool carrier, whereby the tie rod is placed under tension due to the resultant loading thereon, the improvement comprising, in combination, detection means operatively associated with each tie rod to detect such resultant loading; and control signal producing means operatively associated with said detection means, and operable by said detection means, responsive to a predetermined resultant loading of the tie rod, to produce a control signal.

2. In a toolholding arrangement, the improvement claimed in claim 1, wherein said control signal producing means comprises a switch operable by said elongation detection means, and a relay controlled by said switch.

3. In a toolholding arrangement, the improvement claimed in claim 1, wherein said elongation detection means comprises a bar extending parallel to the tie rod and fixedly secured at one end to a first point on the tie rod spaced, toward said one end of the tie rod, from that zone of the other end of the tie rod on which bearing pressure is exerted on the tie rod by said second tool carrier responsive to movement of said first tool carrier into cooperating relation with said second tool carrier; said control signal producing means including a switch mounted at a second point of the tie rod in the zone at which said bearing pressure is exerted on the tie rod; said switch being operable by the other end of said bar responsive to a preset difference between the length of said bar and the distance between said first and second tie rod points.

4. An arrangement as claimed in claim 3, wherein the switch is a precision switch connected to a free end of the bar.

5. An arrangement as claimed in claim 3, wherein the switch is a limit switch working in conjunction with a free end of the bar.

6. An arrangement as claimed in claim 3, wherein the bar is located in an axial end bore of the tie rod.

7. An arrangement as claimed in claim 3, wherein the bar is external to the tie rod.

8. In a toolholding arrangement, the improvement claimed in claim 1, in which said detection means comprises strain gauges connected to said tie rods; said control signal producing means comprising a Wheatstone bridge including said strain gauges, and a switch operatively connected to said bridge.

9. An arrangement as claimed in claim 8, wherein said gauges are provided on a bar that is axially parallel and firmly connected at both ends to the tie rod.

10. An arrangement as claimed in claim 9, wherein the bar is arranged in an axial end bore of the tie rod.

11. In a toolholding arrangement, the improvement claimed in claim 1, in which said detection means comprises a piston and cylinder assembly interposed between said second tool carrier and the tie rod; a source of fluid under pressure connected to said cylinder; said control signal producing means comprising a fluid pressure responsive switch communicating with said cylinder and operable responsive to a predetermined increase in the fluid pressure in said cylinder.

* * * * *